United States Patent [19]

Furukawa et al.

[11] Patent Number: 4,622,547
[45] Date of Patent: Nov. 11, 1986

[54] MEMORY ACCESS CONTROL APPARATUS

[75] Inventors: Shunsuke Furukawa, Tokyo; Yoshitsugu Hattori, Ichikawa; Yoshihiko Matsumoto, Isezaki; Hiroshi Okubo, Atsugi, all of Japan

[73] Assignee: Sony Corporation, Tokyo, Japan

[21] Appl. No.: 396,083

[22] Filed: Jul. 7, 1982

[30] Foreign Application Priority Data

Jul. 7, 1981 [JP] Japan .................... 56-106127

[51] Int. Cl.$^4$ .............................. G06F 9/00
[52] U.S. Cl. .................................. 340/750
[58] Field of Search ... 364/200 MS File, 900 MS File; 340/750

[56] References Cited

U.S. PATENT DOCUMENTS

| 4,117,469 | 9/1978 | Levine | 364/200 |
| 4,121,283 | 10/1978 | Walker | 364/200 |
| 4,482,979 | 11/1984 | May | 364/900 |
| 4,511,965 | 4/1965 | Rajaram | 364/200 |

Primary Examiner—Gareth D. Shaw
Assistant Examiner—John G. Mills
Attorney, Agent, or Firm—Lewis H. Eslinger; Alvin Sinderbrand

[57] ABSTRACT

In a microcomputer system with an asynchronous working central processing unit (CPU) and a cathode ray tube (CRT) display, a memory access control apparatus includes a memory, particularly a video RAM, a CRT controller connected to the CRT for accessing the memory, a system clock for generating system clock pulses which are supplied to the CPU, a multiplexing clock for generating multiplexing clock signals based on the system clock and having a frequency which is one-half the frequency of the system clock pulses, and a multiplexer connected to the CPU and the CRT controller through which the CPU and the CRT controller selectively access the memory in a time sharing manner according to the multiplexing clock signals.

6 Claims, 26 Drawing Figures

MEMORY ACCESS CONTROL APPARATUS

BACKGROUND OF THE INVENTION

1. Field of the Invention

This invention relates to a microcomputer apparatus, and more particularly, to a memory accessing control apparatus that permits a central processing unit and a cathode ray tube controller to access a memory in a time sharing manner.

2. Description of the Prior Art

In microcomputer systems, the output is frequently displayed on a cathode ray tube (CRT). The data to be displayed can be stored in a video-random access memory (video-RAM) which is accessed by a CRT controller in a direct memory access (DMA) operation.

The central processing unit (CPU) supplies the data to the video-RAM for display. The CRT can flicker if the CPU accesses the video-RAM at the same time that the CRT controller tries to access the video-RAM in a DMA operation. The flicker on the screen of the CRT is undesirable and detracts from the operation of the microcomputer system.

Various methods have been suggested to avoid flickering of the CRT. In one method, the CPU accesses the video-RAM during the fly-back period of the CRT scan when the CRT controller does not access the video-RAM. In another prior art method, the CRT controller and the CPU access the video-RAM in a time sharing manner. In a third prior art method, the CPU cycle-steals with respect to the CRT controller, so that the CRT displays the same data for an extended period of time.

The suggested methods a not completely satisfactory in dealing with the flicker problem of the CRT. According to the first method, the CPU processing must be interrupted so that it can access the video-RAM during the fly-back period of the CRT scan. When the CPU and the CRT controller have time sharing access to the video-RAM, a high speed RAM is required. If the system clock frequency is 4 MHz, the video-RAM must have an access time of about 50 n. sec. The cycle-stealing method can be implemented most easily with a synchronous working CPU such as a 6800-type, in which the machine cycles are equally timed from one clock. It is quite difficult to implement a cycle-stealing operation with an asynchronous working CPU, such as Zilog, Inc. models 8080 or ZOA, in which various machine cycles have different numbers of clock pulses allocated thereto.

OBJECTS AND SUMMARY OF THE INVENTION

It is an object of the present invention to provide a novel memory accessing apparatus for use in a microcomputer system.

It is a further object of the present invention to provide a memory accessing apparatus in which a cathode ray tube controller and a central processing unit access a random access memory in a time sharing manner.

It is yet another object of the present invention to provide a memory control apparatus which permits an asynchronous working central processing unit and a cathode ray tube controller selectively to access a random access memory.

In accordance with one aspect of the present invention, a memory access control apparatus used in combination with an asynchronous central processing unit includes an addressable memory, a controller for accessing the memory, and a multiplexer through which the central processing unit and the controller selectively access the memory in a time sharing manner. In a preferred embodiment, the memory is a video-random access memory which can be allocated to an I/O port of the central processing unit, so that the central processing unit accesses the I/O port in a time-sharing manner.

The above, and other objects, features and advantages of the invention will be apparent from the follwing detailed description of an illustrative embodiment thereof which is to be read in connection with the accompanying drawings.

DESCRIPTION OF THE PREFERRED EMBODIMENT

Figure 1:
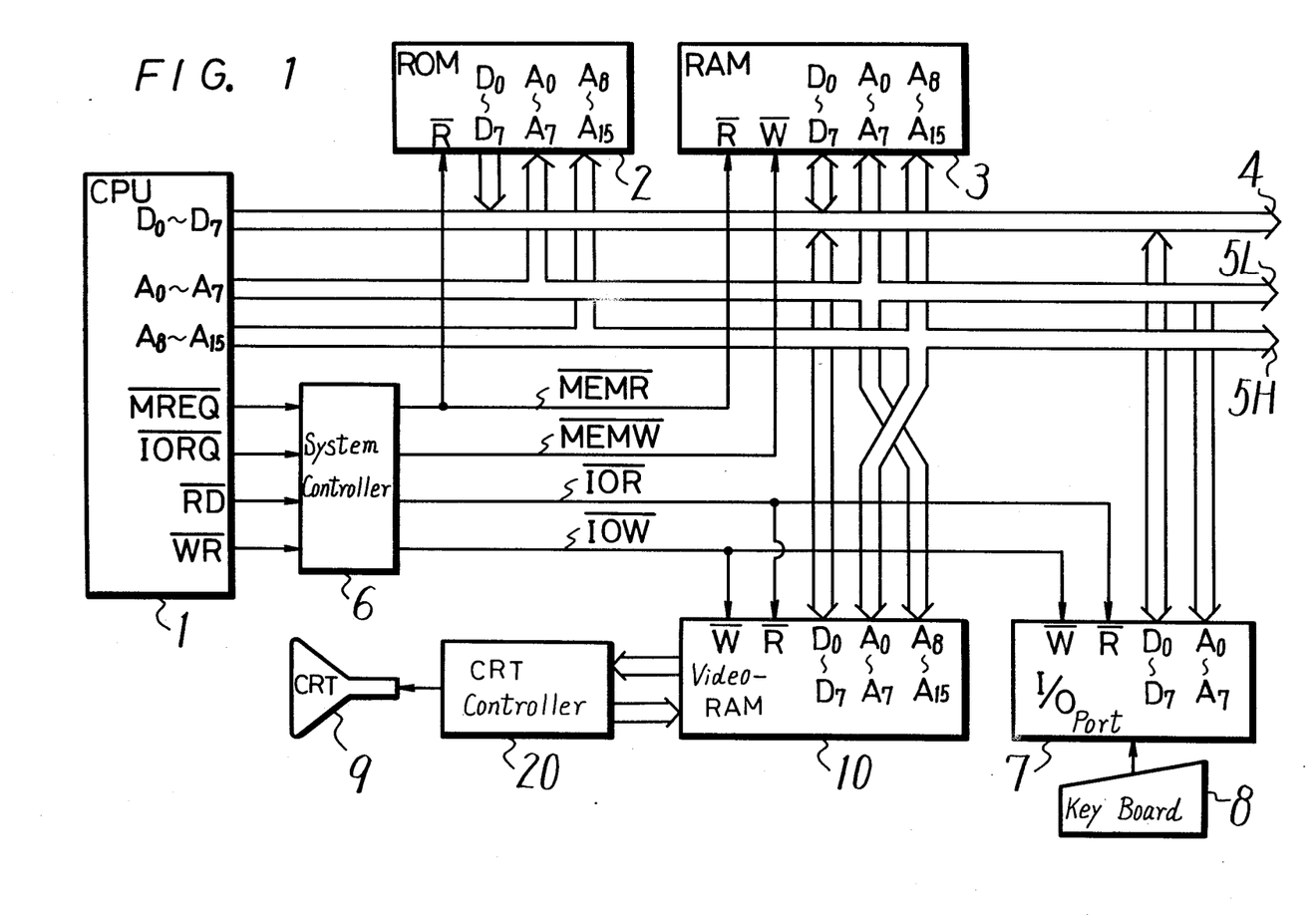
FIG. 1 is a block diagram of a microcomputer apparatus for use with the present invention.
Figure 5A:
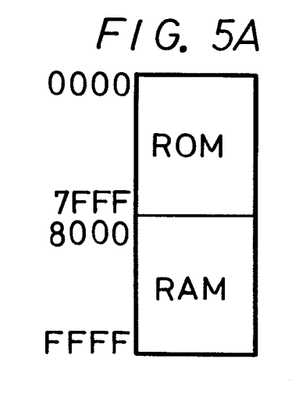
FIG. 5A is a schematic diagram used to explain the memory access allocation of a random access memory and a read only memory.

Referring to the drawings in detail, and initially to FIG. 1 thereof, a microcomputer apparatus includes an asynchronous working central processing unit (CPU) 1 which may, for example, be a Z80A-CPU manufactured by Zilog, Inc., having a clock pulse frequency of 4 MHz. Hereinafter, any reference to CPU 1 will be directed to the Z80A-CPU which will be used for explanatory purposes only. The microcomputer apparatus also includes a read only memory (ROM) 2 which stores a monitor program and a BASIC interpreter program, and which, for example, includes 32K 8-bit address locations from 0000H to 7FFFH, as shown in FIG. 5A.

The microcomputer apparatus also includes a random access memory (RAM) 3 in which a user program can be written and which also serves as a work area for CPU 1. As also shown on FIG. 5A, (RAM) 3 may include 32K 8-bit address locations from 8000H to FFFH. It is to be appreciated that the above numbers of 8-bit address locations are only given for illustrative purposes, and the invention is not limited by the specific figures used. An 8-bit data bus 4, a lower 8-bit address bus 5L and an upper 8-bit address bus 5H are connected to corresponding data terminals $D_0$ to $D_7$, address terminals $A_0$ to $A_7$ and address terminals $A_8$ to $A_{15}$, respectively, of CPU 1, ROM 2 and RAM 3 for transferring information therebetween. Upper 8-bit addresses of $A_8$ to $A_{15}$ are supplied to the B register of CPU 1, and lower 8-bit addresses of $A_0$ to $A_7$ are supplied to the C register of CPU 1. Data in the A register of CPU 1 can be directly supplied to an input/output (I/O) address.

To control the reading of information from ROM 2 and RAM 3, CPU 1 supplies a memory request signal $\overline{MREQ}$ and a read signal RD to respective inputs of a system controller 6 to derive a memory read signal $\overline{MEMR}$ which is supplied to the read terminal $\overline{R}$ of each of ROM 2 and RAM 3. In like manner, to perform a writing operation with respect to RAM 3, a write signal $\overline{WR}$ is generated by CPU 1, and write signal $\overline{WR}$ and the aforementioned memory request signal $\overline{MREQ}$ are supplied to respective inputs of the system controller 6 to derive a memory write signal $\overline{MEMW}$ which is supplied to the write terminal $\overline{W}$ of RAM 3.

An input/output (I/O) port 7 is provided for connection with peripherals, such as, a keyboard 8. The data terminals $D_0$ to $D_7$ are coupled to the data bus 4, and the address terminals $A_0$ to $A_7$ are coupled to address bus 5L. To control the reading of information from I/O port 7, CPU 1 supplies an I/O request signal $\overline{IORQ}$ and a read signal $\overline{RD}$ to system controller 6 to derive an I/O read signal $\overline{IOR}$ which is supplied to read terminal $\overline{R}$ of I/O port 7. In like manner, to perform a writing operation with respect to I/O port 7, CPU 1 supplies a write signal $\overline{WR}$ and the I/O request signal $\overline{IORQ}$ to system controller 6 to derive an I/O write signal $\overline{IOW}$ which is supplied to write terminal $\overline{W}$ of I/O port 7. The I/O port 7 may have an address of, for example, 30H to FFH.

A video-RAM 10 is provided for displaying the output of CPU 1. A video display controller 20 selectively accesses video-RAM 10 in accordance with the scanning of a CRT 9 to display on that CRT 9 the processing results of CPU 1. Video-RAM 10 has allocated thereto addresses of 12KB running from 0000H to 2FFFH, as shown on FIG. 5B. In the embodiment of FIG. 1, however, a Z80A-CPU is used and the embodiment of FIG. 1 may differ from the embodiment of FIGS. 2 to 10. With the Z80A-CPU, lower 8-bit address terminals $A_0$ to $A_7$ of video-RAM 10 are connected to upper 8-bit address bus 5H, while upper 8-bit address terminals $A_8$ to $A_{15}$ of video-RAM 10 are connected to lower 8-bit address bus 5L. I/O read signal $\overline{IOR}$ and I/O write signal $\overline{IOW}$ derived from system controller 6 are also supplied to read terminal $\overline{R}$ and write terminal $\overline{W}$ of video-RAM 10, just as in I/O port 7. Data terminals $D_0$ to $D_7$ of video-RAM 10 are connected to data bus 4.

Figure 5B:
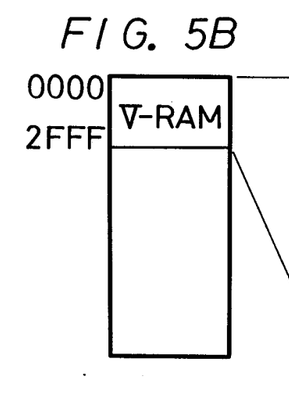
FIGS. 5B and 5C are schematic diagrams used to explain the memory address allocation of a video-random access memory used in accordance with the present invention.

ROM 2 and RAM 3 are allocated to the memory addresses of CPU 1, while video-RAM 10 and I/O port 7 are allocated to I/O port addresses of CPU 1. The address allocations are shown in FIGS. 5A and 5B.

With respect to ROM 2, RAM 3, and I/O port 7, all instructions from CPU 1 can be executed by the A register. Data in video-RAM 10 can be accessed by the BC registers of CPU 1.

Figure 5C:
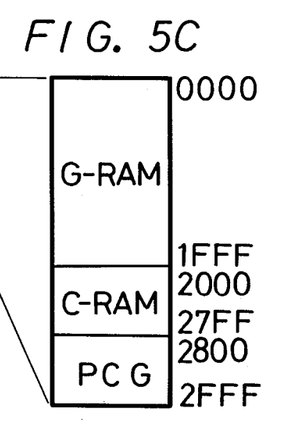

Video-RAM 10 and video display controller 20 will be described more fully with reference to FIGS. 5B and 5C. With reference to FIG. 5C, video-RAM 10 is made up of three separate RAM's, a graphic display video-RAM (G-RAM), a character display video-RAM (C-RAM), and a programmable character generator video-RAM (PCG-RAM). The addresses from 0000H to 1FFFH are allocated to the G-RAM, the addresses of 2000H to 27FFH are allocated to the C-RAM, and the addresses from 2800H to 2FFFH are allocated to the PCG-RAM.

Figure 6:
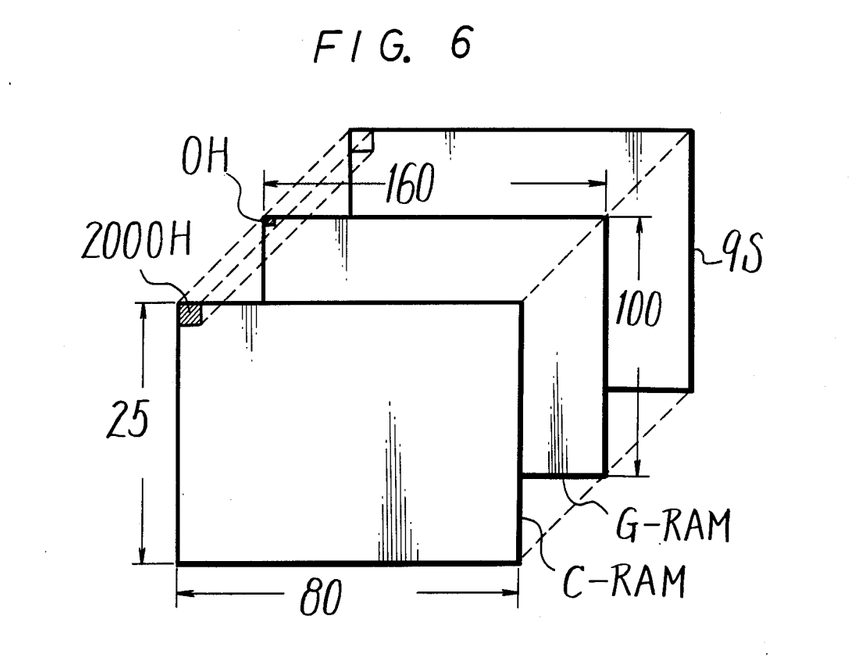
FIG. 6 is a schematic diagram used to explain the display of an image on a screen of a cathode ray tube from data stored in the video-random access memory of FIGS. 5B and 5C.

As illustrated in FIG. 6, the G-RAM may display a graphic plane comprising 100 rows and 160 columns of data, and the C-RAM may display a character plane comprising 25 rows and 80 columns. The two planes from the G-RAM and the C-RAM are superimposed on each other for display on a screen 9S of CRT 9. In the illustrated embodiment, the character of the first address of the G-RAM (0H address) and the character at the first address of the C-RAM (2000H address) are superimposed on the upper left corner of screen 9S.

Figure 7:
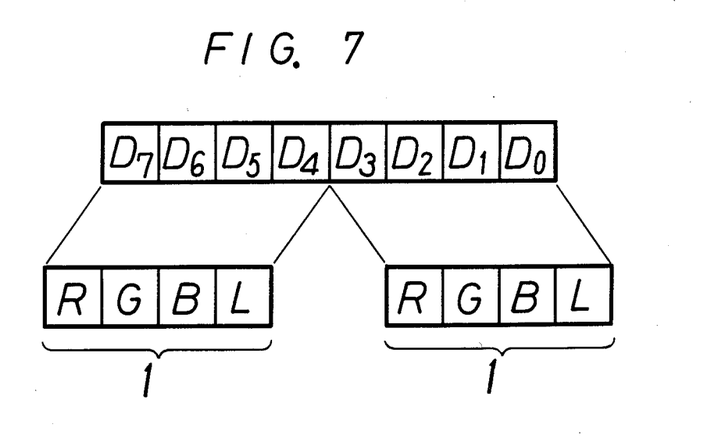
FIG. 7 is a schematic diagram used to explain how data of four bits are allocated to one dot in the video-random access memory of FIGS. 5B and 5C.

In FIG. 7, one byte in the G-RAM represents two dots, with four bits allocated to one dot. One of the four bits represents the color red (R), one bit represents the color green (G), one bit represents the color blue (B), and one bit represents the luminance (L) of the dot. Each dot can thus be one of eight colors, and each color can be either dark or light.

In the C-RAM, one byte represents a code for one character. In the PCG-RAM, 256 desired patterns can be expressed.

Figure 2:
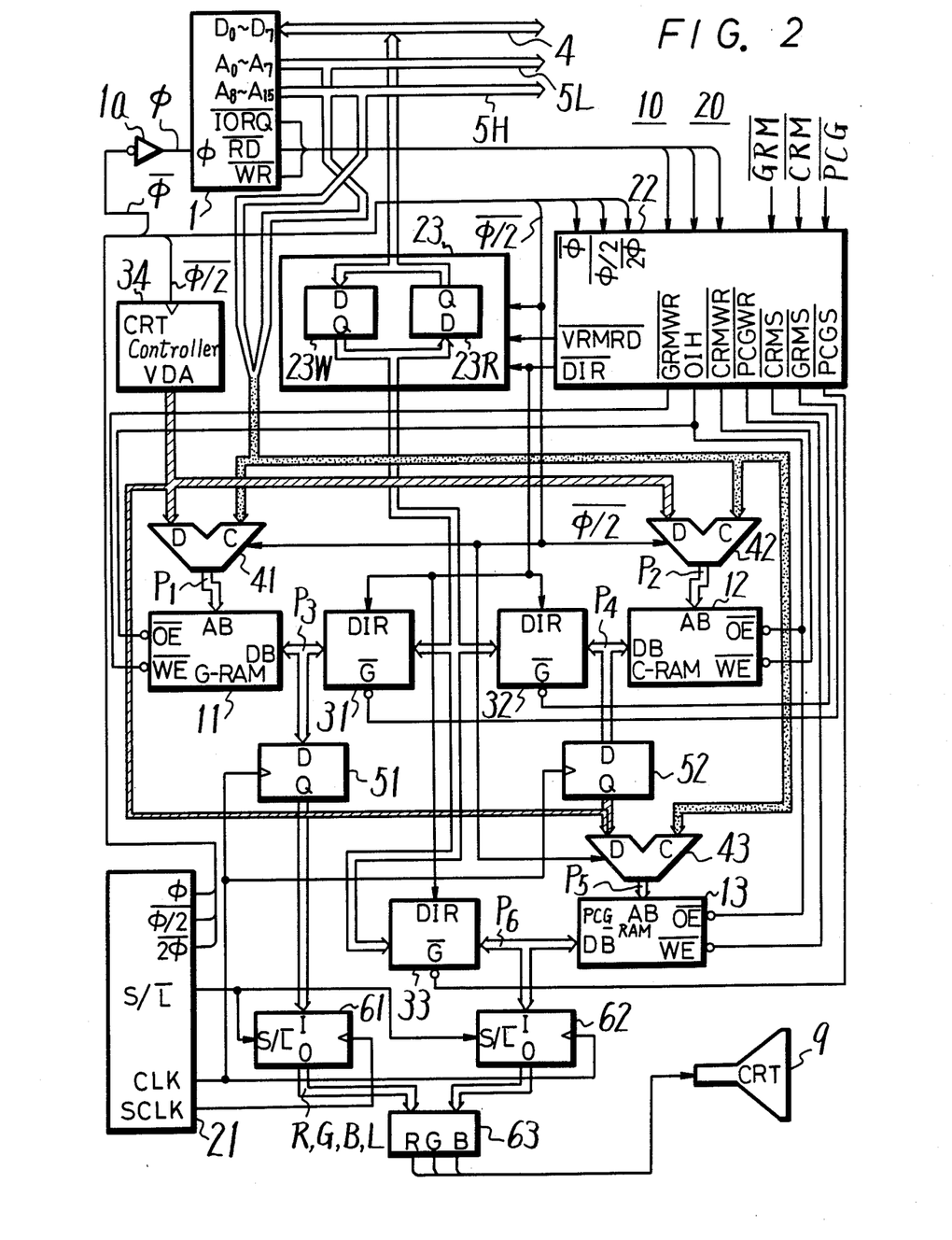
FIG. 2 is a block diagram of a memory access control apparatus according to one embodiment of this invention.
Figure 3:
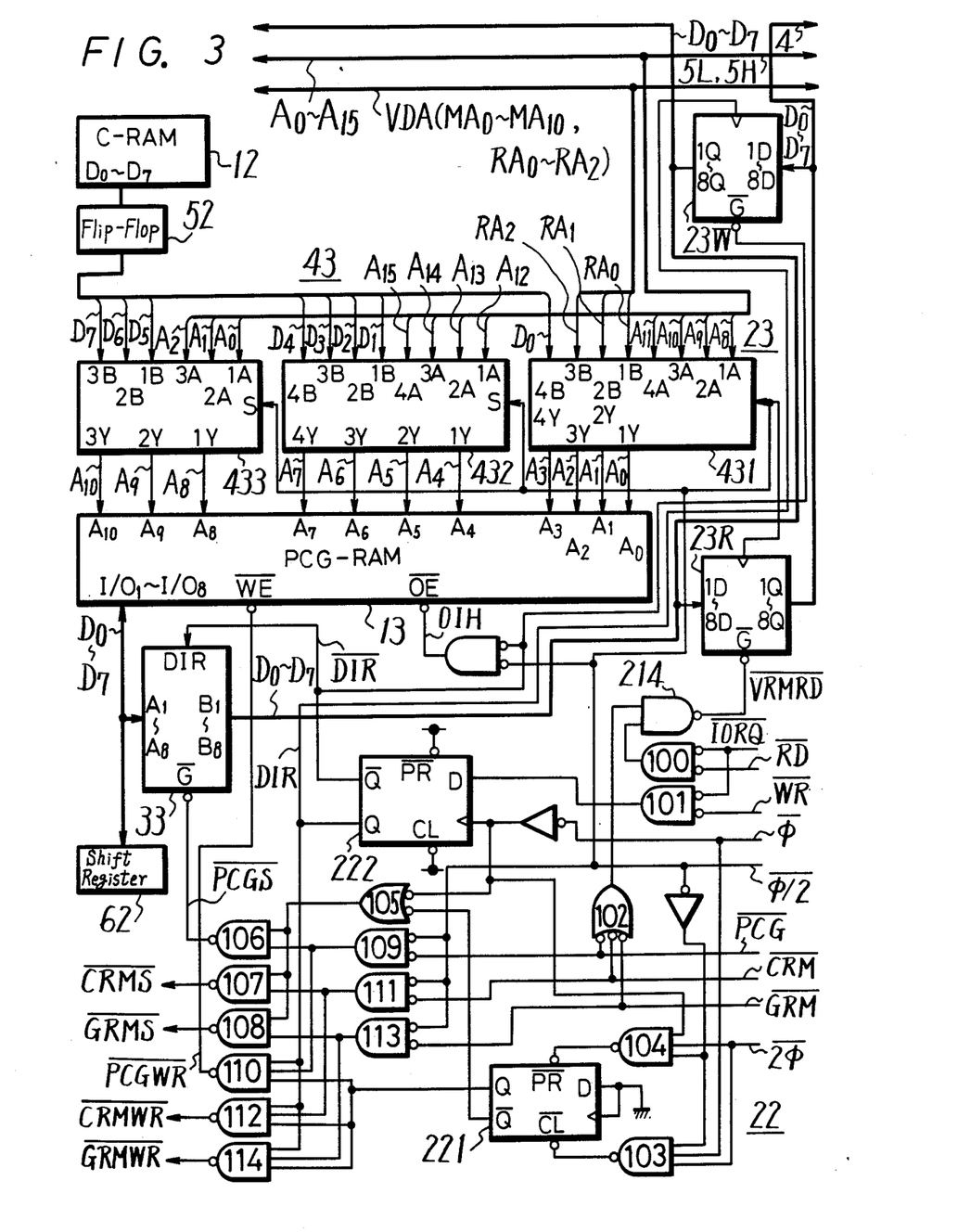
FIG. 3 is a detailed block diagram of a portion of the memory access control apparatus of FIG. 2.

With reference to FIGS. 2 and 3, the meanings of the signals used in the illustrative embodiment are indicated as follows:

$\bar{\phi}$: a clock pulse which, in the illustrative embodiment, is 4 MHz. A signal $\phi$, which is the $\bar{\phi}$ inverted, is the clock pulse of the CPU 1.

$\bar{\phi}/2$: A clock pulse with a frequency $\frac{1}{2}$ that of the clock pulse $\bar{\phi}$, and synchronized therewith. In the illustrative embodiment, $\bar{\phi}/2$ is 2 MHz.

$2\bar{\phi}$: A clock pulse with a frequency of twice the clock pulse $\phi$ and synchronized therewith. In the illustrative embodiment, $2\bar{\phi}$ is 8 MHz.

$\overline{S/L}$: A signal to control a shift register, in which the shift operation is performed when it is in the "H" state, and the load operation is performed when it is in the "L" state.

OIH: A signal for controlling the input and/or output state of a data terminal of a RAM.

$\overline{GRM}$: A signal for decoding the address of the G-RAM utilizing address signals $A_0$ to $A_{15}$.

$\overline{CRM}$: A signal for decoding the address of the C-RAM utilizing address signals $A_0$ to $A_{15}$.

$\overline{PCG}$: A signal for decoding the address of the PCG-RAM utilizing address signals $A_0$ to $A_{15}$.

$\overline{GRMS}$: A signal, derived from the signal $\overline{GRM}$ by windowing with the signals $\bar{\phi}/2$ and $\bar{\phi}$ which selects the data bus driver of the G-RAM when it is "L".

$\overline{CRMS}$: A signal, derived from the signal $\overline{CRM}$ by windowing with the signals $\bar{\phi}$ and $\bar{\phi}/2$ which selects the data bus driver of the C-RAM when it is "L".

$\overline{PCGS}$: A signal, derived from the signal $\overline{PCG}$ by windowing with the signals $\bar{\phi}$ and $\bar{\phi}/2$ which selects the data bus driver of the PCG-RAM when it is "L".

$\overline{GRMWR}$: A write pulse for the G-RAM.
$\overline{CRMWR}$: A write pulse for the C-RAM.
$\overline{PCGWR}$: A write pulse of the PCG-RAM.
$\overline{VRMRD}$: A read signal supplied to a pair of flip-flops which is "L" when CPU 1 reads data from video-RAM 10.
$\overline{DIR}$: A signal to control the direction of the data buses.

In FIG. 2, a G-RAM 11, a C-RAM 12, and a PCG-RAM 13, each having output enable terminals $\overline{OE}$ and write enable terminals $\overline{WE}$ are shown to be included in video-RAM 10. When the output enable terminals $\overline{OE}$ are "H", data can be read from RAMs 11, 12, and 13. When write enable terminals $\overline{WE}$ are "L", data can be written into RAMs 11, 12 and 13.

A system clock generator 21 generates clock pulse signals $\overline{\phi}$, $\overline{\phi/2}$, $\overline{2\phi}$, signal $\overline{S/L}$ for controlling shift registers, and signals CLK and SCLK, to be explained more fully hereinbelow. Clock pulse signal $\overline{\phi}$ is inverted by inverter 1a and supplied to CPU 1.

Clock pulse signals $\overline{\phi}$, $\overline{\phi/2}$ and $\overline{2\phi}$ from system clock generator 21 are supplied to a time sharing bus multiplex controller 22. System control signals $\overline{IORQ}$, $\overline{WR}$, and $\overline{RD}$ from CPU 1 are supplied to time sharing bus multiplex controller 22, as are signals $\overline{GRM}$, $\overline{CRM}$, and $\overline{PCG}$. Time sharing bus multiplex controller 22 generates, as its outputs, signals $\overline{VRMRD}$, $\overline{DIR}$, $\overline{GRMWR}$, OIH, $\overline{CRMWR}$, $\overline{PCGWR}$, $\overline{CRMS}$, $\overline{GRMS}$ and $\overline{PCGS}$. The circuits to which the above-mentioned signals are supplied will be described more fully hereinbelow.

Figure 10A:
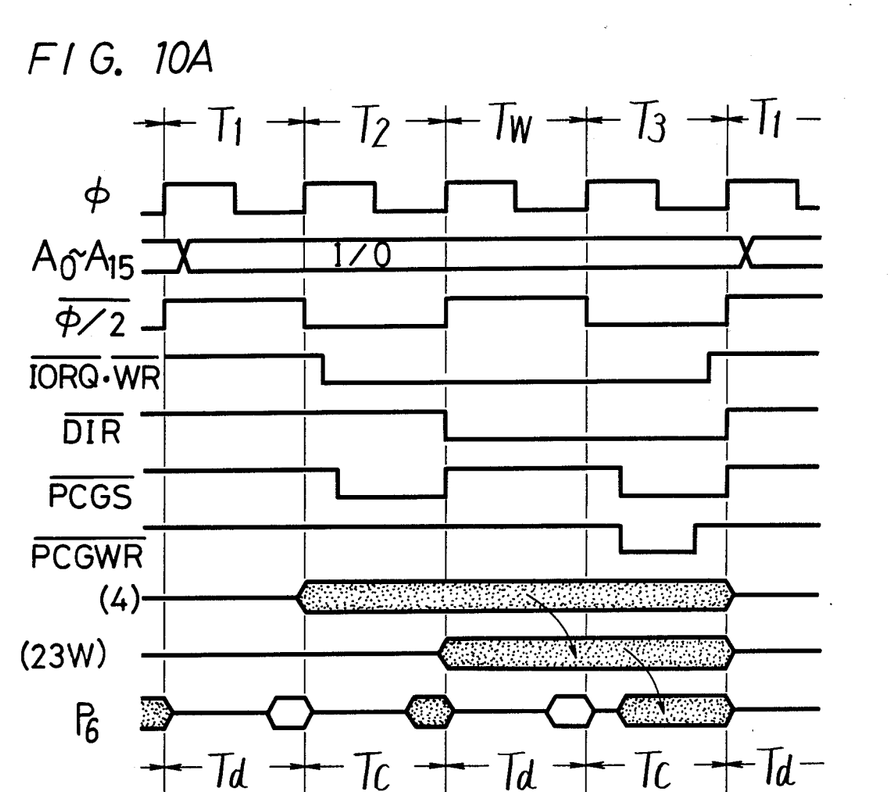
FIGS. 10A and 10B are timing charts illustrating how the central processing unit accesses the video-random access memory of FIGS. 5B and 5C to write data therein.

A CPU interface data bus driver 23 is coupled to data terminals $D_0$ to $D_7$ of CPU 1 by data bus 4. Data bus driver 23 comprises a pair of D flip-flop circuits 23W and 23R. In a preferred embodiment, flip-flop circuits 23W and 23R are 8-bit flip-flops. The flip-flop circuits 23R and 23W function as a read-out port and a write-in port for G-RAM 11, C-RAM 12 and PCG-RAM 13. Write-in port 23W latches data from data bus 4 of CPU 1 at the falling down edge of signal $\overline{DIR}$, and then supplies it to video-RAM 10 when signal $\overline{DIR}$ is "L", as seen in FIG. 10A. Read-out port 23R latches data from video-RAM 10 at the falling-down edge of clock pulse signal $\overline{\phi/2}$ and supplies the data to data bus 4 when signal $\overline{VRMRD}$ is "L".

Data bus drivers 31, 32 and 33 are coupled to G-RAM 11, C-RAM 12 and PCG-RAM 13 by data buses $P_3$, $P_4$ and $P_6$, respectively. Data bus drivers 31, 32 and 33 are coupled to CPU interface data bus driver 23 for transmitting data to and from RAMs 11, 12 and 13. Data bus driver 31 has a terminal $\overline{G}$ coupled to terminal $\overline{GRMS}$ of time sharing bus multiplex controller 22. Data bus driver 32 has a terminal $\overline{G}$ coupled to terminal $\overline{CRMS}$ of time sharing bus multiplex controller 22. Likewise, data bus driver 33 has a terminal $\overline{G}$ coupled to terminal $\overline{PCGS}$ of time sharing bus multiplex controller 22. Data bus drivers 31, 32, 33 function as gates for the read and/or write operation when CPU 1 accesses RAMs 11, 12 and 13 by the data buses $P_1$ to $P_6$. Time sharing bus multiplex controller 22 supplies a signal $\overline{DIR}$ to terminals DIR of data bus drivers 31, 32 and 33 to indicate the direction of data flow thereover.

A CRT controller 34 is supplied with clock pulse signals $\overline{\phi/2}$ from system clock 21. CRT controller 34 accesses RAMs 11, 12 and 13 by a direct memory access (DMA) operation so that the data stored therein can be displayed on CRT 9. CRT controller 34 generates addresses VDA to access RAMs 11, 12 and 13 for the display operation.

Multiplexers 41, 42 and 43 are connected to RAMs 11, 12 and 13 at terminals AB by data buses $P_1$, $P_2$ and $P_3$, respectively. Multiplexers 41, 42 and 43 have input terminals C connected to address terminals $A_0$ to $A_{15}$ of CPU 1 by data buses 5L and 5H. Multiplexers 41, 42 and 43 also have CRT controller 34 connected thereto at input terminals D. Multiplexers 41, 42 and 43 alternately supply addresses from CRT controller 34 and CPU 1 to RAMs 11, 12 and 13 so that CRT controller 34 and CPU 1 can access RAMs 11, 12 and 13 of video-RAM 10 in a time sharing manner. Multiplexers 41, 42 and 43 are supplied with clock pulse signals $\overline{\phi/2}$ from system clock 21 as timing control signals. In a preferred embodiment, multiplexers 41, 42 and 43 permit CRT controller 34 to access RAMs 11, 12 and 13 when clock pulse signal $\overline{\phi/2}$ is "H", and CPU 1 to access RAMs 11, 12 and 13 when clock pulse signal $\overline{\phi/2}$ is "L".

With reference to FIG. 6, there is an offset of 2000H between corresponding address locations in G-RAM 11 and C-RAM 12. When address signal VDA is supplied to multiplexers 41, 42 from CRT controller 34, the value of the signal is shifted by 2000H to accommodate the offset in C-RAM 12. Accordingly, G-RAM 11 and C-RAM 12 are accessed at the same time even though CRT controller 34 supplies a single access address VDA. In the following description, and in FIG. 8, the address M represented by the signal VDA is the address indicated at controller 34, rather than as offset or shifted at C-RAM 12.

Flip-flop circuits 51 and 52 are connected by data buses $P_3$ and $P_4$, respectively, to G-RAM 11 and C-RAM 12. In a preferred embodiment, flip-flop circuits 51, 52 are 8-bit flip-flops. Flip-flop circuit 52 latches data from C-RAM 12 and uses the latched data as an address for PCG-RAM 13 to obtain therefrom a pattern corresponding to the data. Since flip-flop 52 introduces a delay in the data supplied from C-RAM 12, the flip-flop circuit 51 provides a delay for the data supplied from G-RAM 11 so that the data therefrom arrives for display at the same time as the data from C-RAM 12.

Flip-flop 51 is coupled to a parallel input and output shift register 61 which distributes one byte of graphic data (FIG. 6) into two four bit dots. A parallel input and serial output shift register 62 is connected to PCG-RAM 13 and data bus driver 33 by bus $P_6$ and converts the image signal of a one byte character to a font signal. In a preferred embodiment, shift registers 61, 62 are 8-bit registers. The outputs of shift registers 61, 62 are supplied to a multiplexer 63 for synthesizing the graphic signal from shift register 61 with the character signal from shift register 62. Multiplexer 63 produces a three primary color signal in which the graphic and character planes illustrated in FIG. 6 are combined and displayed on CRT 9.

Shift registers 61, 62 are supplied with shift register signals $\overline{S/L}$ from system clock 21. Signal CLK from system clock 21 is supplied to flip-flops 51, 52 and shift register 62. Signal SCLK from system clock 21 is supplied to shift register 61.

In FIG. 3, multiplexer 43 depicted in FIG. 2 comprises three multiplexers 431, 432, 433. Addresses $A_8$ to $A_{11}$ from address bus 5H are supplied to input terminals 1A to 4A of multiplexer 431. Address bits $A_{12}$ to $A_{15}$ are supplied to input terminals 1A to 4A of multiplexer 432. Address bits $A_0$ to $A_2$ are supplied to input terminals 1A to 3A of multiplexer 433. Data bits $D_0$ to $D_7$ from C-RAM 12 and DMA address VDA are supplied through flip-flop 52 to inputs of multiplexers 431, 432, 433 in a time-sharing manner. Data bits $D_0$ are supplied to input terminal 4B of multiplexer 431. Data bits $D_1$ to $D_4$ are supplied to terminals 1B to 4B of multiplexer 432. Data bits $D_5$ to $D_7$ are supplied to terminals 1B to 3B of the multiplexer 433. DMA address VDA includes raster addresses $RA_0$ to $RA_2$ supplied to input terminals 1B to 3B of multiplexer 431. Clock pulse signal $\overline{\phi/2}$ is supplied to input terminals S of multiplexers 431, 432, 433.

Address bits $A_0$ to $A_3$ are supplied from output terminals 1Y to 4Y of multiplexer 431 to the input terminals $A_0$ to $A_3$ of PCG-RAM 13. Address bits $A_4$ to $A_7$ are supplied from output terminals 1Y to 4Y of multiplexer 432 to input terminals $A_4$ to $A_7$ of PCG-RAM 13. Address bits $A_8$ to $A_{10}$ are supplied from output terminals 1Y to 3Y of multiplexer 433 to input terminals $A_8$ to $A_{10}$ of PCG-RAM 13.

Time sharing bus multiplexer controller 22 has input thereto, as seen on the right hand side of FIG. 3, input signals $\phi$, $\overline{\phi/2}$, $\overline{2\phi}$, $\overline{IORQ}$, $\overline{RD}$, $\overline{WR}$, $\overline{GRM}$, $\overline{CRM}$, and $\overline{PCG}$. Input signals $\overline{RD}$ and $\overline{IORQ}$ are supplied to a NOR gate 100 whose output is supplied to a NAND gate 214. The output from a NAND gate 102 having as its inputs signals $\overline{PCG}$, $\overline{CRM}$ and $\overline{GRM}$ is supplied to NAND gate 214. Output $\overline{VRMRD}$ from NAND gate 214 is supplied to terminal G of the flip-flop 23R.

Signals $\overline{WR}$ and $\overline{IORQ}$ are supplied as inputs to a NOR gate 101 which supplies an output signal to input terminal D of flip-flop 222. Clock pulse signal $\phi$ is inverted and supplied to the clock input terminal of flip-flop 222. Output signals DIR and $\overline{DIR}$ supplied to the flip-flop 23W and data bus driver 33, respectively, from flip-flop 222 control the direction of data flow in the read and write operations with respect to PCG-RAM 13.

A D-type flip-flop 221 has supplied at its input terminal $\overline{CL}$ the output of a NAND gate 103 having as its inputs $\overline{\phi/2}$, $\overline{\phi}$, and $\overline{2\phi}$. NAND gate 104 having as its inputs $\overline{\phi/2}$, $\phi$, and $\overline{2\phi}$ supplies an output to terminal $\overline{PR}$ of flip-flop 221. The output signal from the flip-flop 221 controls the signals to be supplied to data bus drivers 31, 32 and 33.

A NAND gate 105 has applied at its input terminals the signal $\phi$ and an output signal from terminal $\overline{Q}$ of flip-flop 221. The output of NAND gate 105 is supplied as an input to NAND gates 106, 107 and 108. A NOR gate 109 has inputs $\overline{\phi/2}$ and $\overline{PCG}$ and has its output supplied to NAND gate 106 and a NAND gate 110. A NOR gate 111 having input signals $\overline{\phi/2}$ and $\overline{CRM}$ supplies an output signal to NAND gate 107 and a NAND gate 112. A NOR gate 113 has input signals $\phi/2$ and $\overline{GRM}$ and supplies an output signal to NAND gate 108 and a NAND gate 114. A signal from output terminal Q of flip-flop 221 is supplied to the inputs of NAND gates 110, 112 and 114. NAND gate 106 supplies an output signal $\overline{PCGS}$ to the $\overline{G}$ terminal of data bus driver 33. NAND gate 107 supplies output signal $\overline{CRMS}$. NAND gate 108 supplies output signal $\overline{GRMS}$. NAND gate 110 supplies its output signal $\overline{PCGWR}$ to input terminal $\overline{WE}$ of PCG-RAM 13. NAND gate 112 supplies output signal $\overline{CRMWR}$. NAND gate 114 supplies output signal $\overline{GRMWR}$.

Figures 4A, 4B:
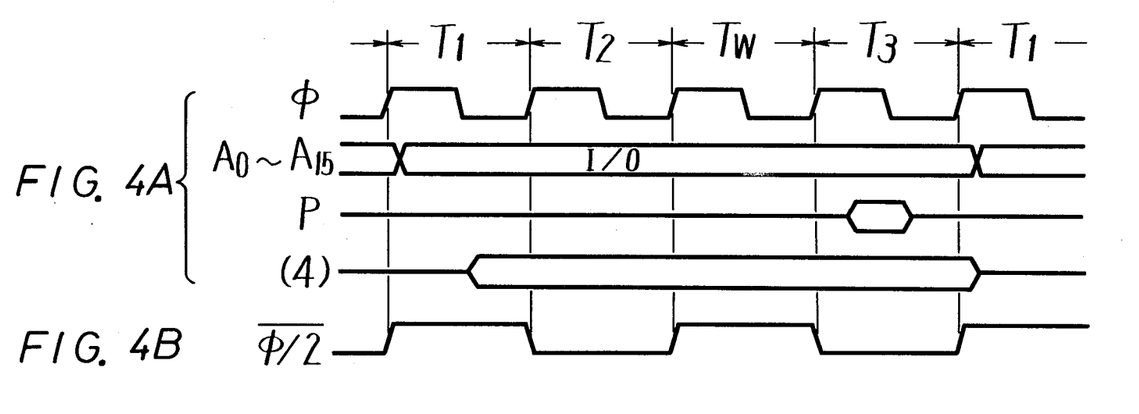
FIGS. 4A and 4B are timing charts illustrating the timing of a central processing unit accessing an input-/output device in accordance with the present invention.

With reference to FIG. 4A, the Z80A-CPU of the exemplary embodiment has six machine cycles $M_1$ to $M_6$ for the execution of a read or write data instruction. The machine cycles use from three to six clock pulse periods $T_1$ to $T_6$ of CPU 1. FIG. 4A illustrates machine cycle $M_2$ which uses period $T_1$ to $T_3$, as indicated by the I/O address on address bus $A_0$ to $A_{15}$. CPU 1 checks a signal $\overline{WAIT}$ during the $T_2$ state, and if it is low, the machine state remains in state $T_2$. State $T_w$ indicates state $T_2$ repeated by signal $\overline{WAIT}$. As illustrated in FIG. 4B, signal $\overline{\phi/2}$ is $\frac{1}{2}$ the frequency of signal $\phi$, and is in synchronism therewith.

FIG. 8 is a timing chart illustrating the operation of an embodiment of the present invention. FIG. 8A illustrates clock pulse $\overline{\phi/2}$ which is low during the period $T_c$ and high during the period $T_d$. During the period $T_c$, the CPU 1 accesses video-RAM 10, while during period $T_d$, CRT controller 34 accesses video-RAM 10 in a DMA operation.

Figures 8A, 8B:
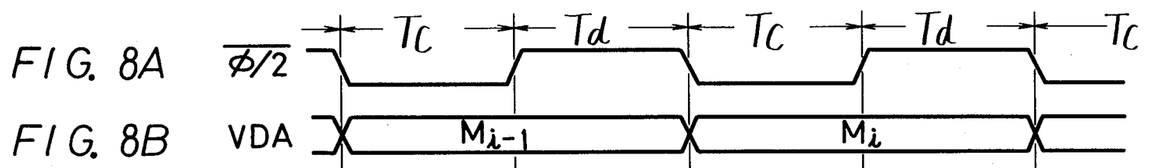
FIGS. 8A through 8L are timing charts used to explain the time-sharing operation of the central processing unit and the cathode ray tube controller in accessing the video-random access memory of FIGS. 5B and 5C.

In FIG. 8B, the DMA address $M_{i-1}$ is generated during periods $T_c$ and $T_d$. In the succeeding periods $T_c$ and $T_d$, the next address $M_i$ of signal VDA is generated.

Figure 8C:
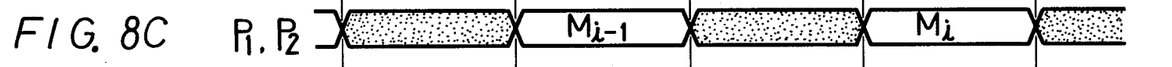
Figure 8D:
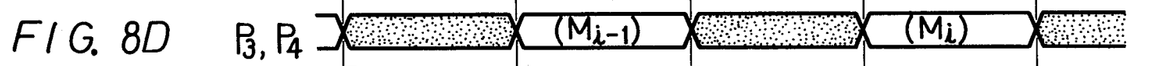

Viewing FIGS. 8B, 8C, and 8D together, during the period $T_c$, CPU 1 occupies buses $P_1$, $P_2$, $P_3$ and $P_4$, as indicated in the figures by the dotted areas. During period $T_d$, when CRT controller 34 accesses video-RAM 10, buses $P_1$ to $P_4$ carry address $M_{i-1}$, as indicated in FIG. 8B. In the next succeeding period $T_c$, CPU 1 occupies buses $P_1$ to $P_4$, while CRT controller 34 occupies buses $P_1$ to $P_4$ with address $M_i$ in the next period $T_d$.

During the period denoted by $T_c$, the signal $\overline{\phi/2}$ is "L", and address buses 5H and 5L are connected through multiplexer 41 to address terminal AB of G-RAM 11 as well as through multiplexer 42 to address terminal AB of C-RAM 12, as shown in FIG. 8C and FIG. 2. As shown in FIG. 8D, data bus 4 is connected through read-out and write-in ports 23W and 23R of data bus driver 23 and, through bus driver 31 and bus $P_3$ to data terminal DB of G-RAM 11 and through bus driver 32 and bus $P_4$ to data terminal DB of C-RAM 12. Accordingly, during the period $T_d$, data at address $M_{i-1}$ are read out from G-RAM 11 and C-RAM 12 by the DMA operation.

Figure 8E:
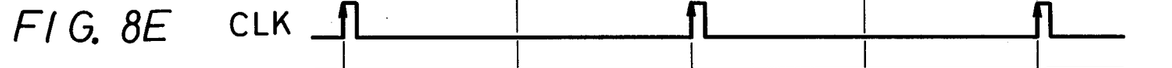

As shown in FIG. 8E, at the end of each period $T_d$, clock pulse signal CLK becomes "H", at which time, the data are latched to flip-flop circuits 51 and 52 from G-RAM 11 and C-RAM 12, respectively.

Figure 8F:
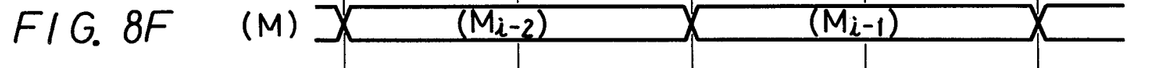
Figure 8G:
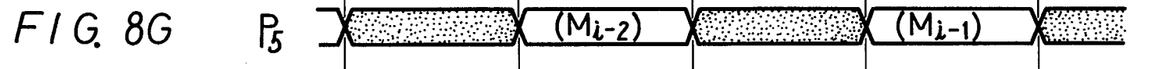
Figure 8H:
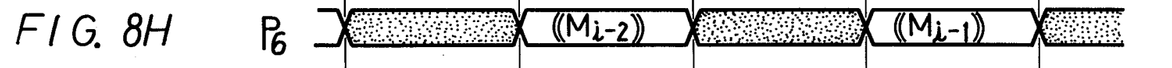

As shown in FIGS. 8F, 8G and 8H, flip-flop circuits 51 and 52 and data buses $P_5$ and $P_6$ contain the address of data $M_{i-2}$ during periods $T_c$ and $T_d$, which is one clock pulse behind data address $M_{i-1}$ on buses $P_1$ to $P_4$.

Figure 8I:
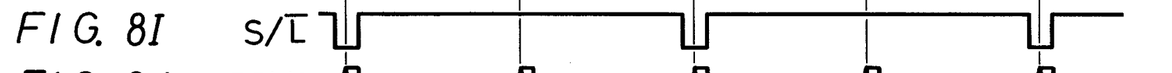
Figure 8J:
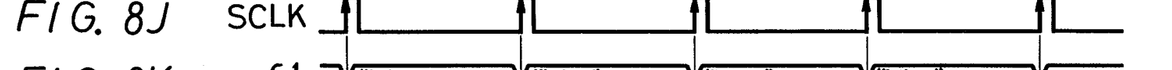
Figure 8K:
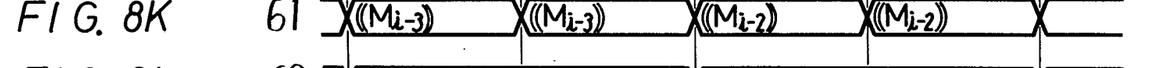

The data from flip-flop circuit 51 are supplied to shift register 61, and, as seen in FIG. 8I, a shift/load signal $S/\overline{L}$ is supplied to shift register 61. When shift/load signal $S/\overline{L}$ is "L", the data are loaded in shift register 61. (Shift/load signal $S/\overline{L}$ goes to "L" when period $T_d$ changes to period $T_c$). Shift register 61 is also supplied with shift pulse SCLK at the start of each of the periods $T_c$ and $T_d$, as seen in FIG. 8J. Thus, as shown on FIG. 8K, register 61 produces the three primary color signals R, G and B and luminance signal L forming the upper 4-bits of the data latched during period $T_c$. During the period $T_d$, shift register 61 produces the three primary color signals R, G and B and a luminance signal L forming the lower 4-bits of the same data, as hereinbefore described. The signals R, G, B and L are supplied to multiplexer 63 for display on CRT 9.

Figure 8L:
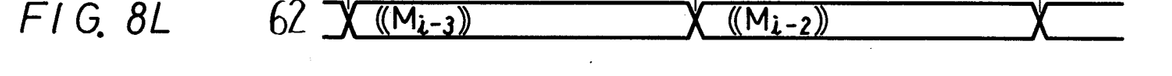

During period $T_d$, data from flip-flop circuit 52 and signals $RA_0$ to $RA_2$ forming part of DMA address signal VDA are supplied through multiplexer 43 to address terminal AB of PCG-RAM 13, whereby the data are read out and delivered to shift register 62. Shift/load signal S/L̄ and clock pulse signal CLK are also supplied to shift register 62, from which the data are read out serially, as illustrated in FIG. 8L. The serially read data are supplied to multiplexer 63 as hereinbefore described. Consequently, multiplexer 63 produces on CRT 9 a three primary color signal by mixing the graphic plane with the character plane of FIG. 6.

Figure 9A:
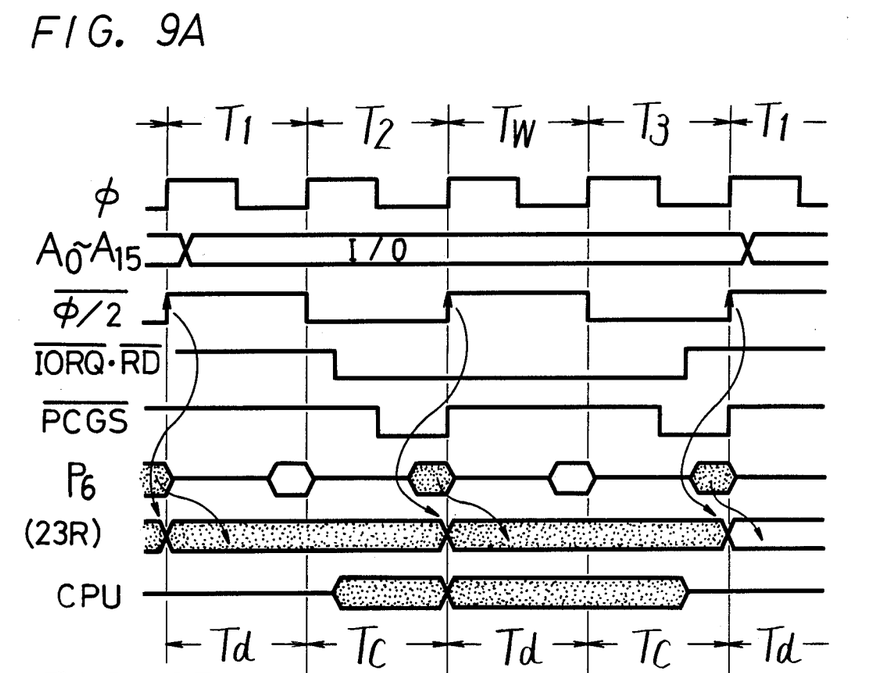
FIGS. 9A and 9B are timing charts illustrating how the central processing unit accesses the video-random access memory of FIGS. 5B and 5C to read data stored therein.
Figure 9B:
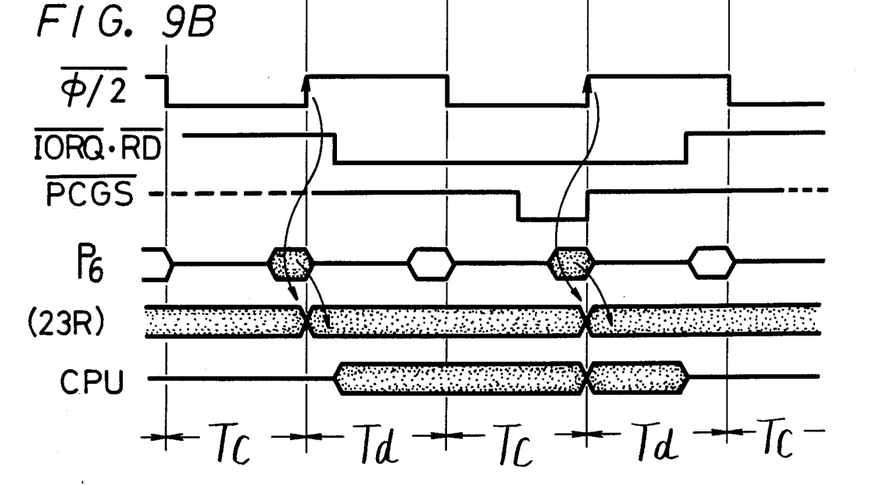

FIGS. 9A and 9B are timing charts illustrating the operation of CPU 1 in reading data from PCG-RAM 13. In FIG. 9A, period $T_1$ is synchronized with period $T_d$, when clock pulse signal $\overline{\phi/2}$ is "H" and CRT controller 34 accesses PCG-RAM 13. At the start of period $T_w$, CPU 1 reads data from PCG-RAM 13. Data read during period $T_2$ are supplied to data bus driver 23R during the following period $T_w$, as indicated by the arrow of FIG. 9A between the graphs labeled $P_6$ and (23R).

In FIG. 9B, the machine states have shifted from $T_1=T_d$ to $T_1=T_c$. In periods $T_1$ and $T_w$, clock pulse signal $\overline{\phi/2}$ is low, indicating that CPU 1 occupies bus $P_6$ to access PCG-RAM 13.

Figure 10B:
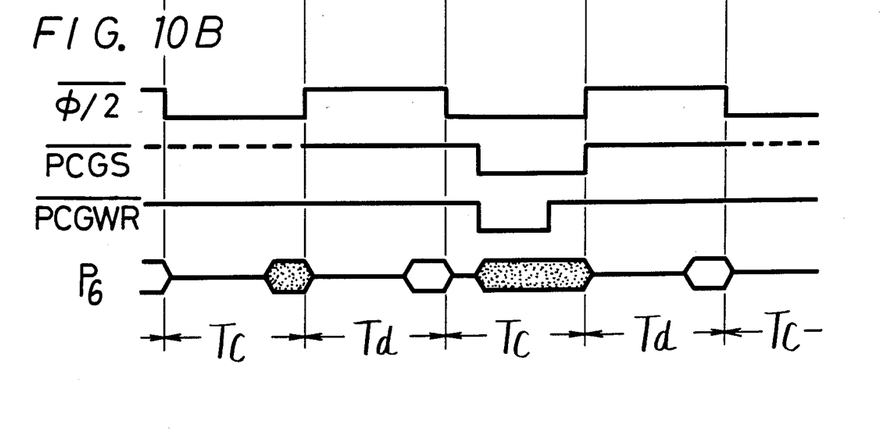

FIGS. 10A and 10B illustrate the timing when CPU 1 writes data in PCG-RAM 13. In FIG. 10A, period $T_1$ is synchronized with period $T_d$, while in FIG. 10B, period $T_1$ is synchronized with period $T_c$.

In FIG. 10A, at the start of the period $T_w$, the signal $\overline{\text{DIR}}$ drops down to latch the data from CPU 1 to flip-flop 23W. The data are supplied to data terminal DB of PCG-RAM 13 during period $T_3$ when signal $\overline{\text{PCGS}}$ is "L".

In FIG. 10B, clock pulse signal $\overline{\phi/2}$ is low during the period $T_w$, indicating that data are written in PCG-RAM 13 by CPU 1 at that time.

According to the invention, random data cannot be accidentally written into PCG-RAM 13. Signal $\overline{\text{PCGS}}$ is not defined in the period $T_1$, so data bus driver 33 has not been selected and the data address is not defined. Signal $\overline{\text{DIR}}$ is "H" during periods $T_1$ and $T_2$, so data bus driver 33 cannot operate to write random data in video-RAM 10.

A Z80A-CPU has a set-up time of 50 n. sec., and a hold time of 0 n. sec. A set-up time for data according to the invention is calculated as follows:

125 (n. sec) − delay time for port 23R relative to the rising of clock pulse signal $\overline{\phi/2}$ = 125 (n. sec) − 28 (n. sec)

= 97 (n. sec)

Since 97 n. sec. is greater than the set-up time of 50 n. sec. for CPU 1, data stored in PCG-RAM 13 can be read out, as illustrated in FIGS. 9A and 9B.

Since a direct memory access is performed for video-RAM 10 in a time sharing manner, CRT 9 will not flicker. Video-RAM 10 is connected to the I/O address of CPU 1, so there is no decrease in the processing speed of CPU 1 when a direct memory access for the display is performed for video-RAM 10. As shown in FIG. 4, the I/O address of the CPU 1 remains the same over more than three clock periods, i.e., over 750 n. sec. Accordingly, CPU 1 and CRT controller 34 each access the memory during a 375 n. sec. period, and video-RAM 10 does not have to be a high speed RAM.

As shown in FIG. 1, ROM 2 and RAM 3 are assigned to respective memory control areas of CPU 1, while video-RAM 10 is assigned to an I/O area thereof. In this manner, video-RAM 10 can be addressed by the BC register pair of CPU 1 in response to I/O instructions. Accordingly, as a result of such allocation with respect to ROM 2, RAM 3 and RAM 10, the programmable or work area that can be used in RAM 3 is not reduced by a video-RAM area so that a larger program area is provided for the user. Further, since the area of video-RAM 10 can be made as large as 32 K bytes, a graphic function having high resolution, for example, 640×400 dots, can be achieved. It is to be appreciated that the instructions or commands given by CPU 1 for ROM 2 and RAM 3 can be similar to those used in conventional microcomputer apparatus, while the I/O instructions or commands can be easily used for video-RAM 10.

Operating instructions for a Z80A-CPU will now be discussed for transferring data between an external I/O port 7 and CPU 1 (and consequently, RAM 3). It is to be first noted that the Z80A-CPU includes at least A, B, C, D, E, H and L general purpose registers and the transfer of 8-bit data between an external I/O port 7 and one or more of these registers occurs through data bus line 4. Corresponding address information is transferred through the 16-bit address bus line comprised of upper 8-bit address bus line 5H and lower 8-bit address bus line 5L. In particular, the following instructions can be used:

I-1  IN A, n

This instruction transfers 8-bit data at an input port designated by number n (n=0–255) to the A register of the CPU.

I-2  OUT n, A

This instruction transfers 8-bit data from the A register of the CPU to an output port designated by port number n. It is to be appreciated that, with these instructions, the 8-bit data from the A register appears both on data terminals $D_0$ to $D_7$ and on address terminals $A_8$ to $A_{15}$. In such case, the lower 8-bit address terminals $A_0$ to $A_7$ are supplied with address information and indicate the port number n.

II-1  IN r, (C)

This instruction transfers data at a port (identified by port number n) designated by the BC register pair to an r register, where the r register is one of the A, B, C, D, E, H and L registers.

II-2  OUT (C), r

The instruction transfers data from the r register to the port (identified by port number n) designated by the BC register pair. Data for the r register appears at data terminals $D_0$ to $D_7$, the C register contains information from address terminals $A_0$ to $A_7$ corresponding to the port number n, and the B register contains information from address terminals $A_8$ to $A_{15}$ corresponding to the I/O device connected to the designated port. Since eight bits of information are provided in the C register, a maximum of 256 (0–255) I/O devices can be connected to each port.

As will be apparent from the discussion hereinafter, the following block transfer instructions are also used with CPU 1:

III-1  INIR, INDR

With these instructions, a plurality of bytes of data, that is, a block of data, can be transferred from a port n to the main memory. In such case, the BC register pair is used to determine the port number (C register) and the number of bytes to be transferred (B register). The data block is transferred to a memory location, the address of which is determined by the HL register pair. For example, the last address location to which the data is to be transferred is stored in the HL register pair. The B register is then used as a counter and counts down to zero. In particular, the value in the B register is continuously decremented by one, and during each decrement of one, one byte of the block is transferred. When the value stored in register B is equal to zero, all of the bytes of the block of data have been transferred from the respective I/O port designated by the C register.

III-2    OTIR, OTDR

With these instructions, a data block can be transferred from the main memory to an I/O port designated by the C register. The HL register pair and the B register are used in a similar manner to that described above.

It is to be appreciated that the upper 8-bit address terminals $A_8$ to $A_{15}$ are different from the I/O address terminals $A_0$ to $A_7$ of I/O port 7, so that CPU 1 can distinguish between video-RAM 10 and I/O port 7.

Having described a specific preferred embodiment of the invention with reference to the accompanying drawings, it is to be understood that the present invention is not limited to that precise embodiment and that various changes and modifications may be effected therein by one skilled in the art without departing from the scope or spirit of the invention as described in the appended claims herein.

What is claimed is:

1. A display memory access control system in combination with an asynchronous central processing unit providing main memory addresses and I/O addresses and including a master clock emitting clock pulses at a predetermined frequency, with each of said I/O addresses being provided for a duration greater than three cycles of said clock pulses, comprising:

main memory means addressable by said main memory addresses from said central processing unit;

display random access memory means for storing display data and being addressable by said I/O addresses from said central processing unit so that the work area available for programs in said main memory means is not restricted by the need to store display data;

display means for displaying the display data stored in said display random access memory means;

display controller means for generating addresses for DMA addressing of said display random access memory means;

data bus means connecting said display random access memory means with said central processing unit and with said display means;

address bus means connecting said central processing unit and said display controller with said display random access memory means;

multiplexing means interposed in said address bus means and having a first state in which said I/O addresses from said central processing unit are applied to said display random access memory means, and a second state in which said addresses generated by said display controller means are applied to said display random access memory means so that there is no decrease in the processing speed of said central processing unit when providing direct access to said display random access memory means by said display controller means;

and multiplexing control means generating a control signal applied to said multiplexing means and having alternating first and second levels corresponding to said first and second states, respectively, of said multiplexing means and which are cyclically repeated at a frequency which is one-half said predetermined frequency of the clock pulses thereby avoiding the need for high speed operation of said display random access memory means.

2. The combination according to claim 1; in which said display means includes a cathode ray tube, and said addresses generated by said display control means are coordinated with scanning of a roster in said cathode ray tube.

3. The combination according to claim 2; in which said display random access memory means includes a plurality of random access memories for storing data corresponding to respectively different kinds of displays, each of said random access memories is allocated to a respective range of said I/O addresses, said multiplexing means includes a plurality of multiplexers interposed in said address bus means for said plurality of random access memories, respectively, and being simultaneously changed between said first and second states in response to said first and second levels of said control signal, and said display means includes means for synthesizing display data read from said plurality of random access memories for display by said cathode ray tube when said control signal is at said second level.

4. The combination according to claim 1; in which said central processing unit further includes an I/O port to which less than all of said I/O addresses are applied through said address bus means.

5. The combination according to claim 4; in which said I/O addresses include 16 bits, and only the lower 8 bits are applied to said I/O port.

6. The combination according to claim 5; in which said lower 8 bits of the I/O addresses from said central processing unit are coupled through said address bus means to the upper 8 bits of the addresses of said display random access memory means, and the upper 8 bits of said I/O addresses are coupled to the lower 8 bits of the addresses of said display random access means.

* * * * *